April 7, 1959  H. S. BURNS ET AL  2,880,817
LOUDSPEAKER SYSTEM
Filed Oct. 28, 1953  4 Sheets-Sheet 1

Inventors
Harold S. Burns
Paul A. de Mars
by Roberts, Cushman & Grover
Att'ys.

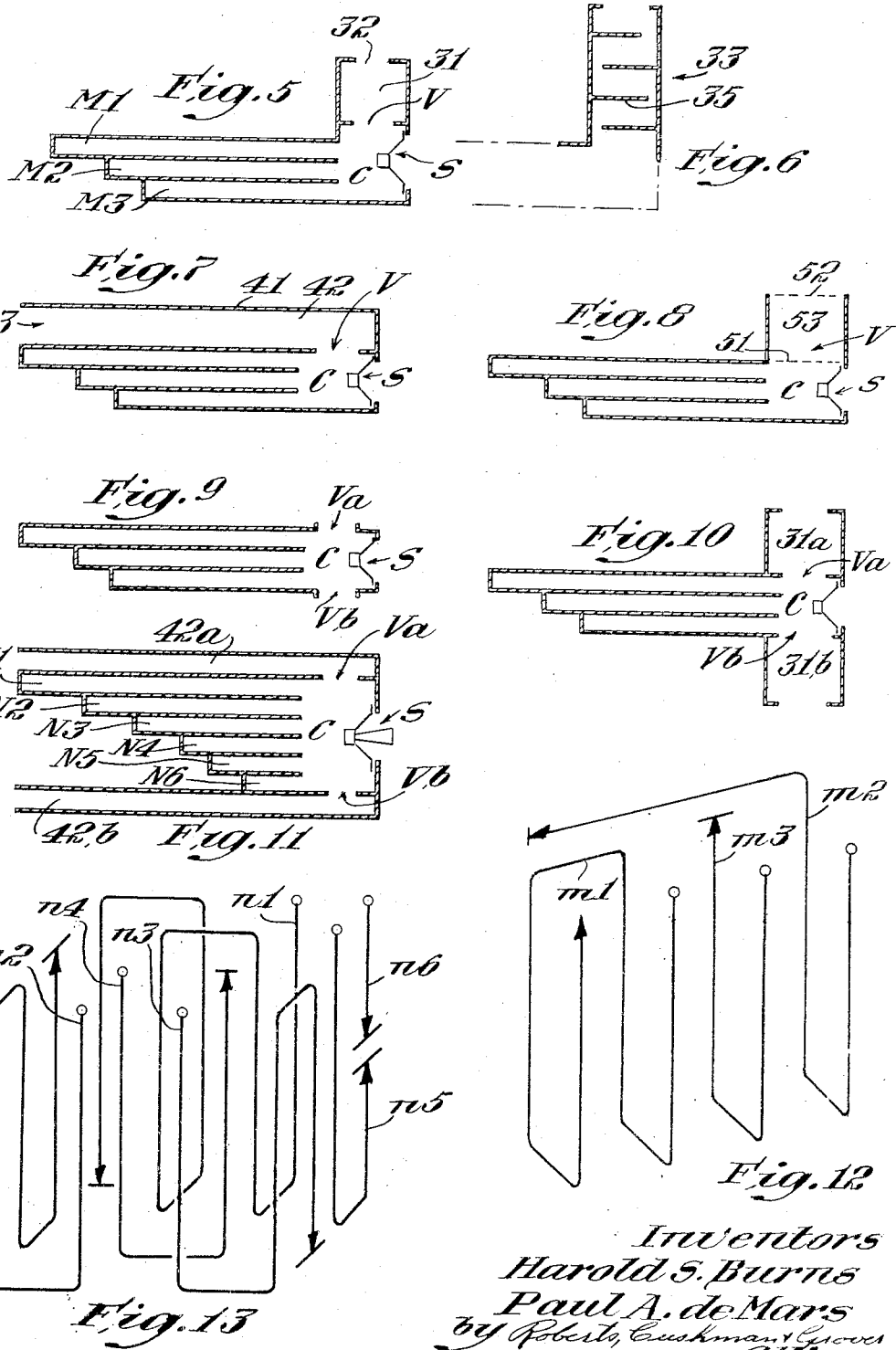

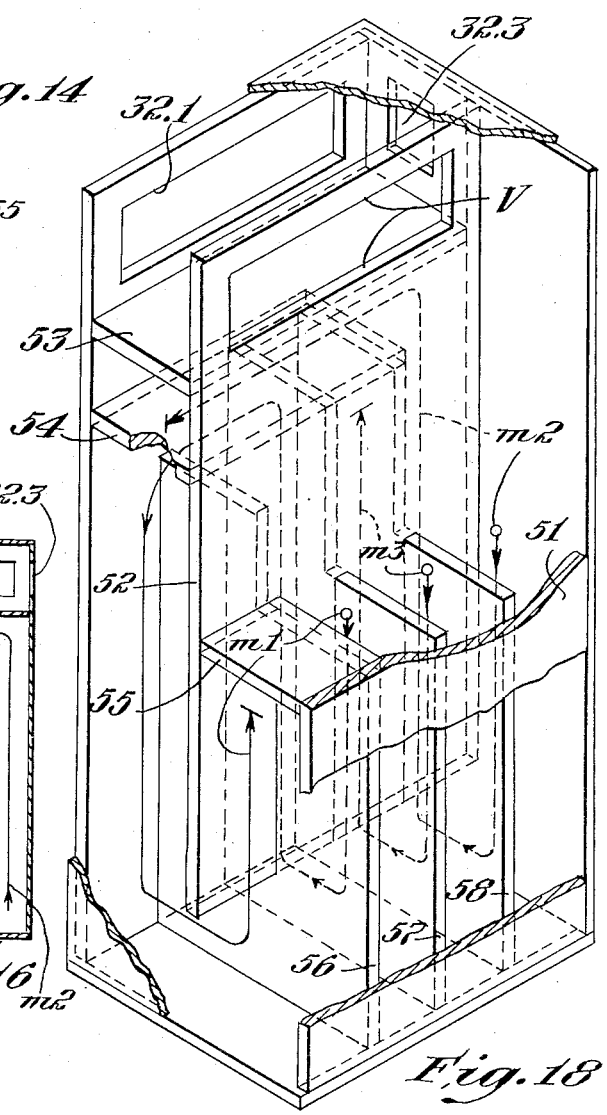

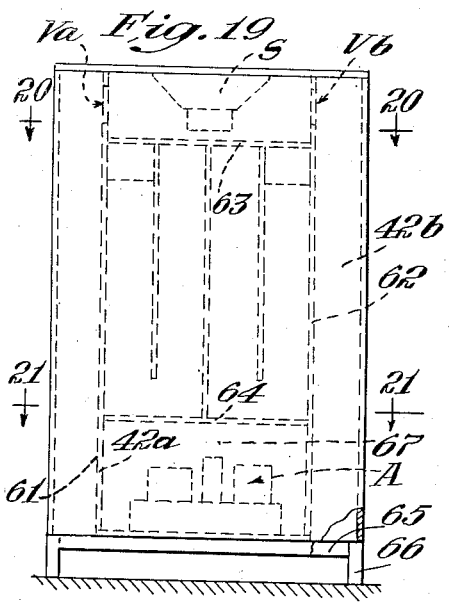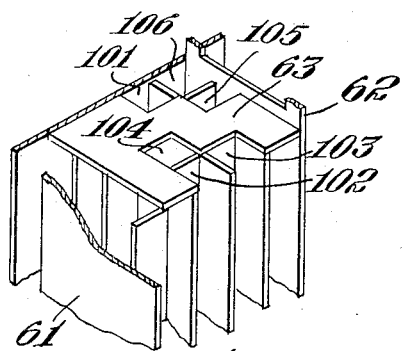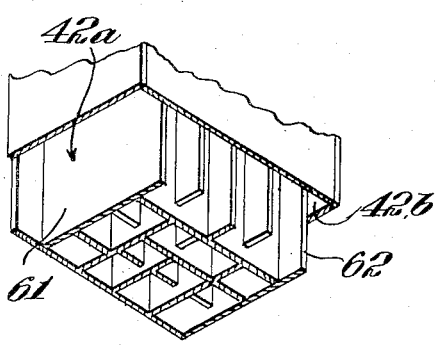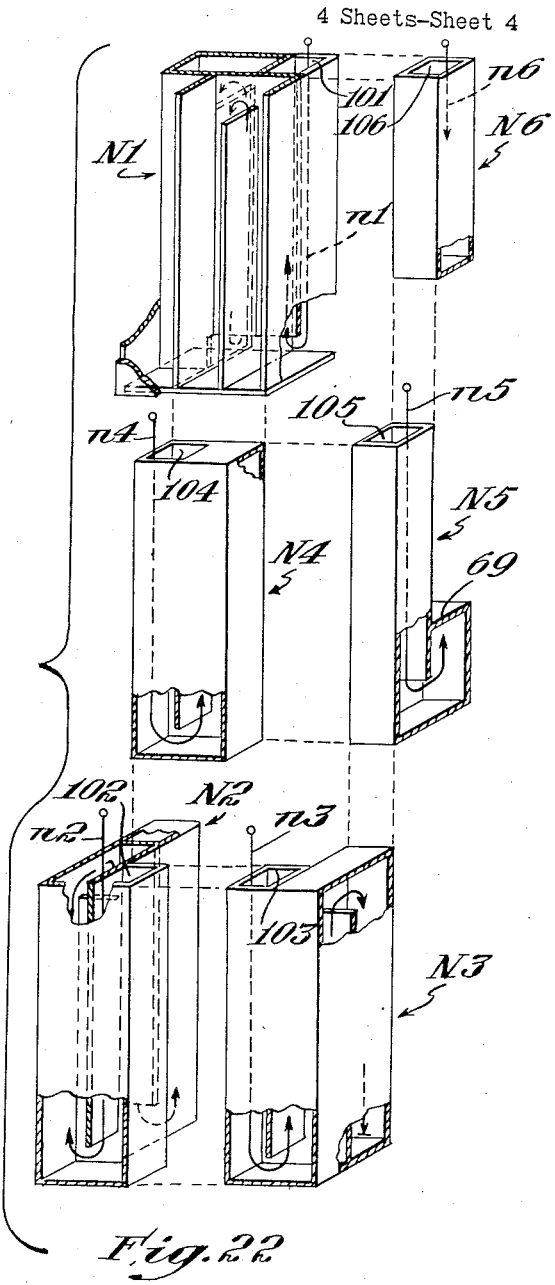

United States Patent Office 2,880,817
Patented Apr. 7, 1959

2,880,817

LOUDSPEAKER SYSTEM

Harold S. Burns, Norwood, and Paul A. de Mars, Belmont, Mass., assignors to Pickard & Burns, Inc., Needham, Mass., a corporation of Massachusetts Application October 28, 1953, Serial No. 388,798

13 Claims. (Cl. 181—31)

This invention relates to acoustic apparatus, specifically to acoustically effective loudspeaker enclosures.

As an aid in understanding the invention a few pertinent principles of acoustics will first be recapitulated.

The invention is preferably applied to speakers of the direct radiator electrodynamic transducer type. The theory of conventional direct radiator loudspeakers in an infinite baffle is for example described with reference to Fig. 6.1 on page 124 of "Elements of Acoustical Engineering" by Harry F. Olson, Van Nostrand, sec. ed., 1947, which figure includes the mechanical construction, the voice coil circuit and the mechanical circuit of such a loudspeaker. As shown by such descriptions as this, these systems are quite complex, but for present purposes it is sufficient to keep the following in mind. An electro acoustic transducer is at the higher frequencies essentially a mass controlled vibrating system. When it is mounted in a baffle that is large compared to the wave length in question, the velocity is inversely proportional to the frequency so that the sound power output is practically independent of frequency. At some low frequency the combined electrical and mechanical inductances, and the inertances of the electrical, mechanical and acoustic circuits resonate with the compliance of the cone suspension system. Below this frequency the system is no longer mass controlled so that the response in an infinite baffle falls off rapidly, at the rate of about 12/db per octave. In practice it is possible to produce direct radiator loudspeakers which resonate below the range of desired response, and such speakers may be considered as mass controlled systems. In the following discussion it is assumed that the loudspeakers used for purposes of the invention are such mass controlled systems within the range of frequencies they are expected to reproduce.

When such a speaker is housed in an open backed cabinet, the mechanical circuit differs from that of the ideal infinite baffle system in the manner described with reference to Fig. 6.18 on page 149 of Olson, supra. When housed in a closed cabinet the speaker has the characteristics described with reference to Fig. 6.22, page 152 of Olson.

Such systems permit faithful reproduction of low frequency sound but the closed loudspeaker housings required for that purpose have to be made so carefully and become so large that their cost and bulk make them unsuitable for use in the home or other places where space is limited. Baffles are similarly unsatisfactory because, if they are made sufficiently compact to permit their use in the home, they ordinarily either offer little low frequency response or have a sharp peak in their bass output. This sharp peak, which represents an undamped resonance of the vibrating system, results in poor transient response usually referred to as "boominess," "hangover," "ringing," or "one-note bass."

The compact, simple open-back cabinets which are widely used for the loudspeakers of commercial radios, suffer from both defects, namely poor low frequency response and resonance peak. The radiations from the front and the back of the speaker cancel through destructive interference at low frequencies while at some higher frequency there is constructive interference causing the peak. Closing the back of such a comparatively small cabinet eliminates the interference by shutting off the back radiation of the speaker. However, the limited volume of air trapped in the closed box adds an effective stiffness to the vibrating system, increasing the resonant frequency and reducing the low frequency response.

In order to improve these performances, various resonator systems have been proposed. If a resonator is built into the interior of the closed cabinet, the radiation from the back of the speaker cone sees a very low impedance at the natural frequency of the resonator, and this is chosen to be near that of the speaker itself, thus relieving the stiffness associated with the closed box and extending the low frequency response. The resonator can be of the lumped parameter (Helmholtz) type or the distributed parameter (quarter wave length tube closed at the far end) type.

Another improvement involves acoustical phase inversion by way of a port coupling the cabinet to the air. In such a so-called bass reflex cabinet the effective stiffness of the air in the cabinet is resonated with the effective mass of the air associated therewith through the port. The effective impedance presented to the speaker motion is comparatively high, but by choosing the natural frequency of the port-box system near the resonate frequency of the speaker, the phase of the radiation from the port can be shifted relatively to that from the back of the speaker. The phase angle between the velocity of the cone front can thus be made very small so that the port radiation will add to that from the speaker front, extending the low frequency response. This bass reflex cabinet with air vent represents a lumped parameter resonant system; a distributed parameter version thereof can be obtained by venting to the outside by way of a quarter wave length tube open at both ends.

All systems with an auxiliary resonator need, however, to be tuned very precisely. If the adjustment is not correct the response will contain a large, sharp peak, and the performance will be worse than without the auxiliary resonator. Some of these systems are capable of giving good reproduction, but in practice most do not. One of the reasons for this is the manufacturing variation of speakers. Even if the commercial builder intends to fit his cabinets to a model of loudspeaker the characteristics of which are believed to be known, these manufacturing variations require in addition individual tuning of each speaker and cabinet combination to bring out its possibilities. In addition, the resonate frequency of a given speaker will change slowly with age and use, which causes progressive deterioration of the quality of reproduction.

It is thus apparent that the loudspeaker housing is of primary importance in determining the bass response of a loudspeaker system and that previous systems are inadequate in achieving extended low frequency response reasonably free of sharp peaks by way of commercially feasible components.

It is one of the principal objects of the invention to provide a comparatively compact commercially feasible housing assembly for the conventional electro dynamic loudspeaker that will provide adequate and essentially flat response at the low frequency portion of the audio frequency spectrum without critical dependance on the peculiarities of the speaker. Another important object is to provide a loudspeaker assembly of that type with a plurality of acoustical elements which, although of widely varying lengths, are accommodated within a minimum space of optimum dimensional relations.

One of the features by means of which these objects are attained is the use of a multiplicity of auxiliary resonators rather than only one, within the interior of the housing. As mentioned above, near its natural frequency a resonator presents a low impedance to the vibrating system, thus eliminating the stiffness of the limited volume of air in the housing at that frequency. In order to widen this beneficial result, a plurality of resonators is used, each being tuned to a different frequency, the frequencies being spaced over the region in which it is desired to avoid the housing stiffness. However, increasing the number of resonators is not enough largely because this expedient results without further improvement, in a frequency response which contains a multiplicity of peaks. Some damping of these peaks can be achieved by special resonator configuration and by the use of sound absorbing material, but these expedients result in poor efficiency if sufficient damping is obtained, so that very little improvement is obtained in this way. In contradistinction thereto, a principal feature of the present invention is the adequate dampening of a multiplicity of resonators by way of venting from the back of the speaker. This damping effect results from the acoustic resistance introduced into the resonant system by the sound radiated from the vents. By judicious selection and correlation of the resonators, of the acoustic capacity of a coupling chamber enclosing the back of the speaker and leading into the resonators, and of the acoustic coupling of this chamber through vents to the outside air, efficient and smooth augmentation of low frequency response can be achieved over a wide range of frequencies without critical dependance on the speaker. At very low frequencies radiation from the vent tends to cancel that from the front of the speaker. However, according to another feature of the invention, restriction of the amount of venting minimizes this cancellation while yielding a still adequate degree of damping.

Another principal feature of speaker assemblies according to the invention is the possibility of modular accommodation of their plurality of resonators within a housing of acceptable dimensions and proportions, because the resonator design depends mainly on length and is uncomplicated by configurational requirements which necessitate unused spaces.

Accordingly, the new loudspeaker system comprises, in one of the aspects of the invention, the combination of an electro-acoustical transducer with a set of resonators (such as sounding tubes) of stepped effective volumes selected to resonate at frequencies within a selected range (such as the entire low frequency range), with a coupling chamber between the transducer and the resonators, and with a venting device for damping the resonator response, whereby the resonators can be selected as to acoustical properties (especially resonant frequency and harmonics) to augment the output within the selected range without introducing undesirable peaks.

In another important aspect, a loudspeaker assembly according to the invention has a cabinet which houses the transducer within a coupling chamber with damping vent means and the resonators, and in addition duct or skirt means leading along the housing from the vent means to the air at the side opposite the coupling chamber, these duct means having in essence the effect of a baffle. In a successful embodiment the coupling chamber with venting port in one or several sides is at the top of an upright parallelepipedal housing which also contains the resonator tubes which are accommodated below the coupling chamber, and which housing furthermore contains duct or skirt means in the form of one or more compartments extending along one or more sides of the housing, being closed to the outside at the chamber end where they open into the venting port or ports, and being open at the bottom. It will be understood that a similar housing can be arranged with the skirt positioned horizontally rather than vertically and the chamber and the resonators side by side.

In a further important aspect of the invention an especially compact, economical and yet acoustically fully sufficient speaker assembly of the above construction includes modularly stacked resonator sections, in the form of polygonal tubes fully occupying a space which can be correlated to the coupling chamber and the skirt structures in such a way that the ensemble has compact and well proportioned outside contours and minimum dimensions.

These and other objects and aspects of the invention will appear from the herein presented outline of its principles, its mode of operation and its practical possibilities together with a description of several typical embodiments illustrating its novel characteristics. These refer to drawings in which Fig. 1 is a schematical longitudinal section through a loudspeaker assembly incorporating the principle of the invention in simple form;

Figs. 5 to 11 are schematical sections similar to Fig. 1, of various modifications of the invention;

Figs. 12 and 13 are axonometric diagrams of the resonator axes of embodiments according to Figs. 5, 14 to 18, and 11, 19 to 22, respectively; the coordinate geometry of Fig. 12 corresponds to that of Fig. 18, and the geometry of Fig. 13 corresponds to that of Fig. 22;

Fig. 14 is a side elevation of a practical embodiment of an assembly according to Fig. 5;

Figs. 15, 16 and 17 are cross-sections on lines 15—15, 16—16 and 17—17 respectively of Fig. 14;

Fig. 18 is an axonometric view with parts broken away, of the embodiment according to Figs. 5 and 14 to 17, indicating to resonator axes of Fig. 12;

Fig. 19 is a front elevation of a practical embodiment of an assembly according to Fig. 11;

Figs. 20 and 21 are axonometric views of the top and bottom portions, respectively, of the resonator portions of Fig. 19 sectioned on lines 20 and 21 of Fig. 19, respectively; and Fig. 22 is an exploded axonometric view of the resonator units of Figs. 19 to 21, indicating the resonator axes of Fig. 13.

The several embodiments which will now be described illustrate the application of a multiplicity of resonators, with acoustic load damping according to the invention, in various degrees of refinement and improvement in extended low frequency range. In all embodiments a standard commercial type of loudspeaker can be employed, for example the speaker known under the trade designation "Altec Type 601–A," which consists of a 12" cone for the low frequencies and a coaxially mounted high frequency horn speaker. This latter element is independent of the cabinet or enclosure assembly according to the invention which affects the response to the low frequency cone only, although it is understood that the principles of the invention can be applied to any frequency range and to other types of speakers including single voice coil transducers, so long as these principles hold for the speaker in question. The speaker can be mounted in any conventional manner without in any way affecting the performance of the assembly.

Figure 1:
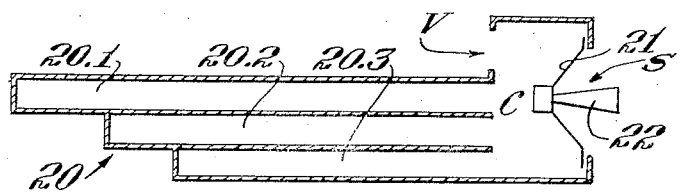

Fig. 1 shows a chamber C to one side of which is coupled a set of air columns 20 in the form of resonator tubes 20.1, 20.2, 20.3. Within the chamber C is the back of the cone 21 of a speaker S. In the above mentioned preferred construction the speaker has a high frequency horn unit 22 which is not affected by the enclosure of the opposite side of the low frequency unit. The chamber C communicates with the outside air through a vent or port V.

The lengths of columns 20.1, 20.2 and 20.3 are chosen to resonate at different frequencies distributed over the bass range. In a successful embodiment of this type with three resonators, these respond at 26, 32 and 40 cycles per second respectively.

Closed quarter wave length tubes are preferred to open tubes resonating with waves twice their length, because the former preserve the favorable characteristics of a cabinet which is closed with the exception of the dampening vent—because they render the function of the vent more certain and hence facilitate its dimensioning—because they exclude even harmonics and hence facilitate the distribution and control of harmonic resonance, and because they require less space. However, the principles of the invention do not exclude the use of open half waves resonators for all or selected frequencies, if such should be desirable for any particular reason.

Figure 2:
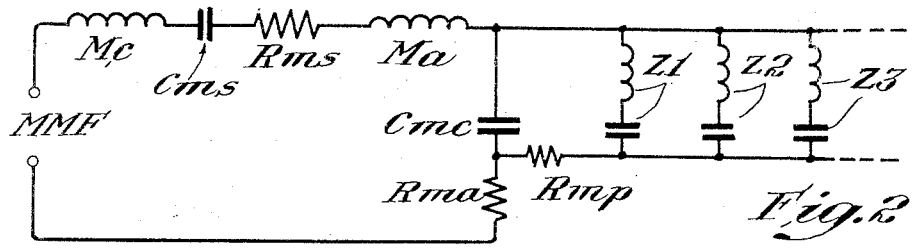
Figs. 2 and 3 are mechanical circuit diagrams illustrating the acoustical properties of a system according to Fig. 1.

The mechanical circuit of a system according to Fig. 1 is shown in Fig. 2, wherein MMF represents the mechanomotive force in the voice coil, Mc the mass of the cone and the voice coil, Cms the compliance of the suspension system, Rms the mechanical resistance of the suspension system, Ma the mass of the air load, Cmc the compliance of the chamber C, Rma the mechanical resistance of the air load on the front of the cone, and wherein Rmp represents the mechanical resistance of the acoustic air load on the vent V. Resonant systems Z1, Z3, Z5 represent the air columns 20.1, 20.2, 20.3 at their fundamental mode and odd harmonic modes of resonance.

Figure 3:
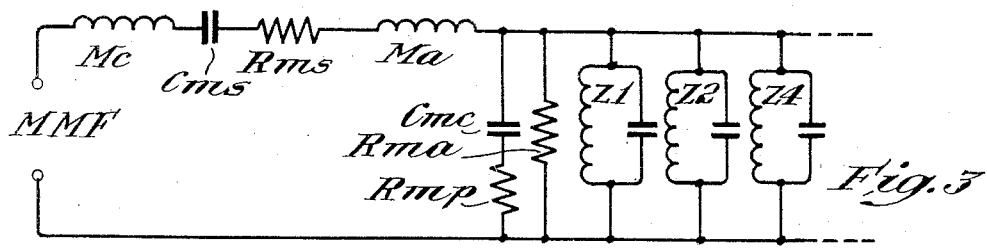

Fig. 3 is identical with Fig. 2 except that the schematic representation of the air columns 20.1, 20.2, 20.3 is shown for the condition of even harmonic or antiresonant state.

It will be apparent that over a range of frequencies the operation of such a system becomes very complex. However the Figures 2 and 3 indicate that in general, at the frequencies at or near resonance of any one of a plurality of air columns 20.1, 20.2, 20.3, etc. the compliance of the chamber C is short circuited through the acoustic load Rmp on the vent V. Under this condition the respective impedance approaches zero and the resonant air column behaves as though it did not exist and did not have any influence on the compliance of the chamber C. By a judicious selection of the resonant column lengths and of the amount of venting through port V, the limitation of the chamber compliance is effectively reduced over a wide frequency range. This permits essential fulfillment of the purpose of the invention to extend the response of the speaker, in an enclosure of practical dimensions, to lower frequencies than is otherwise possible.

Figure 4:
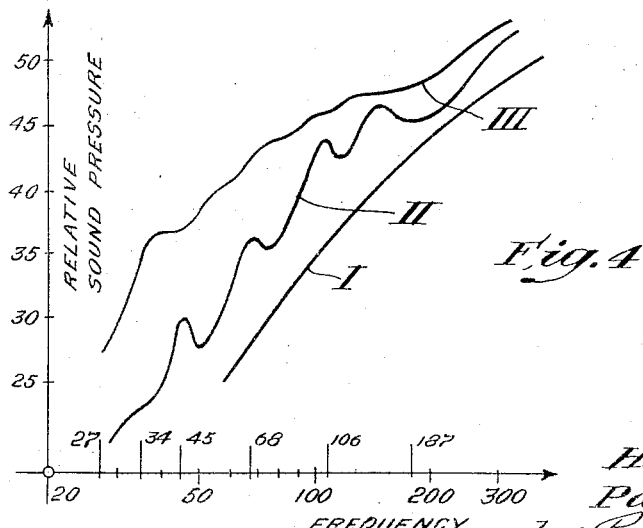
Fig. 4 is a performance diagram of a system according to Figs. 11, 13 and 19 to 22.

Fig. 4 illustrates this improved response. This figure is based on actual tests of an assembly according to Figs. 19 to 22 with an Altec 601–A speaker and six stopped resonators 18, 32, 50, 75, 100 and 125 inches long and responding to the frequencies of 187, 106, 68, 45, 34 and 27 c.p.s. respectively. The curve trains are slightly smoothed for the sake of clarity of reproduction. Relative sound pressures are plotted over frequencies on a logarithmic scale. The curve I is the characteristic of the speaker in a conventional infinite baffle. Curve II is the characteristic of the assembly shown in Figs. 19 to 22, but without the skirts or folded baffles shown in these figures. Curve III is the characteristic of the assembly with skirts. It will be evident from this diagram that the dampened resonators introduce a considerable gain of satisfactory smoothness, which characteristic is further improved by the skirts.

By judicious selection of the resonator dimensions it is possible to utilize the harmonics for further improvement, by laying them into the intervals between resonator responses of higher frequency or between other harmonics. It will be evident that this involves a good deal of trial and error, especially if it is desired to accommodate the resonators within a given housing filling it without introducing inactive spaces, as described below with reference to Figs. 12 to 22. However, once the optimum structure is laid out and tested, it is essentially unaffected by the loudspeaker performance and drift.

Figs. 5 to 11 are schematic representations of various modifications and elaborations of the basic structure according to Fig. 1.

Fig. 5 indicates an assembly wherein the vent V discharges into an open cabinet 31 with port 32. This type will be described in detail with reference to Figs. 14 to 18. As indicated in Fig. 6, the cabinet 31 can be subdivided, by walls 35, into a series 33 of several compartments. Both expedients permit control of the damping effect of the vent and of the phase relation between back and front emission of the low frequency speaker.

Fig. 7 illustrates the above mentioned skirt which can be regarded as an infinite baffle turned back towards the housing. This skirt is indicated at 41. It forms a conduit or compartment 42 which communicates through the vent V with the coupling chamber C and through a port 43 with the free air. In a preferred form, described more in detail below with reference to Fig. 19, the skirt discharges against the floor which further improves the baffle effect.

Fig. 8 illustrates an embodiment wherein the chamber C is vented into an acoustic low pass filter comprising perforated baffles 51, 52 and an auxiliary chamber 53. In this embodiment the filter constitutes the vent V of the previously described embodiments. In this instance the chamber C can be made comparatively small with its small compliance short circuited by the resonant columns.

Figs. 9, 10 and 11 illustrate embodiments similar to those described with reference to Figs. 1, 5 and 7 respectively, with the difference that these assemblies have a plurality of vents. Thus, Fig. 8 indicates two simple unrestricted vents Va, Vb, whereas Fig. 10 indicates two vent chambers 31a, 31b, and Fig. 11 indicates two skirt compartments 42a, 42b. It will be understood that the number of such elements can be further increased so long as the combined acoustical effect conforms to the principles of the invention. By way of example of such distribution, the embodiment described below with reference to Fig. 14 may be mentioned which has three ports corresponding to port 32 of Fig. 5.

Fig. 11 shows six resonators, in keeping with an especially successful embodiment of this type which will be explained more in detail with reference to Figs. 19 to 22. It will now be understood that a greater number of resonators for a given frequency range will result in a smoother response within this range.

For a description of the actual structure of typical embodiments of the invention, assemblies of the types of Figs. 5 and 11 have been chosen.

These embodiments particularly illustrate the above mentioned modular folding and interlocking of the resonators. Fig. 12 indicates the axes m1, m2, m3 of the three resonators M1, M2, M3 of Fig. 5, folded fully to occupy a rectilinear cabinet, whereas Fig. 13 similarly indicates the six folded axes n1 to n6 of resonators N1 to N6 of the assembly according to Fig. 11. The following description of Figs. 14 to 18, and 19 to 22 refers to Figs. 12 and 13, respectively, with identical indicia for the respective resonator axes.

Figs. 14 to 18 show a cabinet structure made from readily available material such as ¾" plywood panels well joined to form a coupling chamber C, a vent cabinet 31, three resonators M1, M2, M3, a vent V, and three ports 32.1, 32.2 and 32.3, constituting the port 32 described above with reference to Fig. 5. It will be noted that this structure is closed on all sides with the exception of ports 32 and the opening for the speaker S.

The three resonators M1, M2, M3 are indicated by their axes m1, m2, m3 whose configuration is clearly shown in Fig. 12.

In an actually built assembly of this type, the housing is 48" high, 20" wide and 16¼" deep. The rear port 32.1, which can often be dispensed with, is approximately 8" x 14", and the side ports 32.2 and 32.3 are about 4" x 9". The vent V is approximately 7½" x 14". The speaker is an Altec 601-A or its equivalent, accommodated in an 11" diameter hole in the front panel 51. The resonators are approximately 4" wide and 7" deep. Resonator M1 is 122" long resonating at 28 c.p.s., M2 is 84" long resonating at 40 c.p.s., and M3 is 65" long resonating at 51 c.p.s. It will be noted that this construction provides optimum economy of material, the complete resonator structure consisting, in addition to the indispensible outside walls of the cabinet, of a septum 52, three horizontal partitions 53, 54, 55 each of a width half the depth of the housing, and three vertical partitions 56, 57, 58 which extend through the entire depth of the housing. The resonator ducts are folded around or along partitions which are common to adjacent duct sections, as clearly indicated at the lower end of board 52 in Figs. 14, 15 and 18.

Figs. 19 to 22 show a cabinet structure fabricated similarly to that described with reference to Figs. 14 to 18. Fig. 19 indicates the speaker S, the vents Va and Vb, and the skirts 42a, 42b, also shown in Fig. 11. The resonators N1 to N6 are enclosed between the front and rear panels of the housing, the inner skirt walls 61, 62, and the upper and lower resonator panels 63, 64. In this embodiment, the skirts are continued below the resonator box and terminate at a base frame 65 with legs 66. A compartment 67 is thus formed by the skirts and the front and back panels of the housing, wherein an amplifier A can be accommodated.

The vertical arrangement of the loudspeaker emitting towards the ceiling, and of the skirts discharging downwardly towards the floor has been found very advantageous, but it will be understood that this symmetrical arrangement is not critical and that the spatial correlation and assembly of the various components can be rearranged to suit any given purpose, locality, or mode of manufacture.

Figs. 20 and 21, and particularly also the exploded view of Fig. 22 show the modularly folded and interlocked resonators in a manner not requiring detailed description. Fig. 20 clearly shows the resonator top panel 63 which has six openings 101 to 106 leading into the resonators N1 to N6 therebelow. The bottom panel 64 is fully closed. It will be noted that, with the exception of a partition 69 between resonators N5 and N6, the top and bottom panels, together with six vertical partition walls suitably shortened at appropriate ends, suffice to define the resonators. The exploded view Fig. 22 depicts the resonators as individual boxes in order better to demonstrate their configuration; although they could be thus individually built and afterwards assembled, the integral construction according to Figs. 19 to 21 is preferred.

In an actually built assembly of this type, the housing is 43" high, 27½" wide not counting the base and 18.5" deep, made of ½" plywood. The chamber C measures 6" x 17½" x 17½" inside, the skirts are 4" deep inside, and the resonator ducts have cross-sections of 4" x 4" inside. The vents Va, Vb are approximately 4" x 12". The speaker is an Altec 602-A of 15" diameter. The performance characteristic of this embodiment is described with reference to Fig. 4, and the corresponding resonator data are as follows:

| Unit | Number of sections each 25" | Total length | Resonance at c.p.s. |
| --- | --- | --- | --- |
| N1 | 5 | 125 | 27 |
| N2 | 4 | 100 | 34 |
| N3 | 3 | 75 | 45 |
| N4 | 2 | 50 | 68 |
| N5 | 1¼ | 32 | 106 |
| N6 | ¾ | 18 | 187 |

It will be noted that, as in the embodiment according to Figs. 14 to 18, the space of the resonator box is fully utilized and a favorable resonance peak distribution obtained, as shown in Fig. 4.

While Figs. 19 to 22 show two skirts, this embodiment lends itself well to the incorporation of four skirts, one on each of the four sides, in which case four ports are provided, equivalent to ports Va and Vb.

It should be understood that the present disclosure is for the purpose of illustration only and that this invention includes all modifications and equivalents which fall within the scope of the appended claims.

We claim:

1. An enclosure for an electroacoustical transducer having two sides, which enclosure comprises a resonator device including a damping chamber having the transducer mounted on its wall, a set of resonators outside of and opening directly into said chamber and having stepped effective volumes tuned to a corresponding set of frequencies emitted by the transducer, said wall separating the outside air on one side of said transducer from the air on the other side of the transducer and within the resonator device, and on said damping chamber venting means placed apart from said resonator openings, and having mechanical resistance to provide an acoustic air load sufficient to dampen each one of said resonators, whereby the resonators can be selected to augment the output of the transducer without introducing undesirable peaks of response.

2. An enclosure for an electroacoustical transducer which comprises a plurality of resonators of stepped effective volumes selected to respond at a corresponding plurality of frequencies within at least part of the acoustical spectrum emitted by the transducer, a coupling chamber interposed between said transducer and said resonators and fully opening into the resonators, and vent means associated with said coupling chamber for acoustically damping the response of said resonators being spaced from said resonators and having mechanical resistance to provide an acoustic air load sufficient to dampen each one of the resonators, whereby the resonators can be selected to augment the output of the transducer without introducing undesirable peaks of response.

3. An enclosure for an electroacoustical transducer which comprises a coupling and damping chamber having said transducer mounted on a wall portion thereof and having vent means in a wall portion, a plurality of resonators having stepped effective volumes tuned to a corresponding set of frequencies emitted by the transducer opening into said chamber, said vent means being spaced from said resonators and having mechanical resistance to provide an acoustic air load sufficient to dampen each one of said resonators, and at least one skirt means forming a non-resonant duct leading from said vent means along said resonators to a port opening to air, whereby the resonators can be selected to augment the output of the transducer without introducing undesirable peaks of response and the skirt contributes to the dampening and provides a baffle effect.

4. A loudspeaker system comprising an electroacoustical transducer, a set of resonators of stepped resonant frequencies tuned to a set of stepped frequencies emitted by said transducer, a coupling chamber interposed between said transducer and said resonators, and means for damping each one of said resonators which damping means include vent means in a wall of said coupling chamber set apart from said resonators for connecting each one of said resonators to the air and having mechanical resistance to provide an acoustic air load sufficient to dampen each one of said resonators, whereby the resonators can be selected to augment the output of the transducer without introducing undesirable peaks of response.

5. A system according to claim 4 wherein said damping means consists essentially in an unobstructed aperture leading from said coupling chamber to air.

6. A system according to claim 4 wherein said damping means includes an aperture in said coupling chamber and a cabinet with a port, said cabinet connecting said chamber through said aperture and said port to the air.

7. A system according to claim 4 wherein said damping means includes an aperture in said coupling chamber and an acoustical low pass filter connecting said aperture to the air.

8. A system according to claim 4 wherein said damping means includes a baffle separating an air space in front of the transducer from an air space in back of the transducer, said vent means leading from said chamber to the air space in back of the transducer.

9. A system according to claim 4 wherein said chamber and said resonators are accommodated within an essentially parallelepipedal housing with said chamber and said vent means on one side thereof, and which is further combined with baffle means including a duct leading from said vent means to the other side of the housing where the duct opens into the air.

10. A system according to claim 4 wherein said resonators are tuned to basic and harmonic frequencies which are approximately evenly distributed over at least part of the acoustical spectrum emitted by said transducer.

11. An enclosure for an electroacoustical transducer comprising: a set of resonators of stepped resonant frequencies tuned to a set of stepped frequencies emitted by the transducer; a rectilinear coupling chamber interposed between the transducer and said resonators; said resonators being essentially rectilinear tubes of stepped acoustical lengths conforming to said stepped frequencies, modularly folded and stacked adjacent to each other essentially completely to occupy a rectilinear space adjacent to said coupling chamber; and means for damping each one of said resonators including vent means in a wall of said coupling chamber set apart from said resonators for connecting each one of said resonators to the air and having mechanical resistance to provide an acoustic air load sufficient to dampen each one of said resonators; whereby resonators occupying a minimal space can be selected to augment the output of the transducer without introducing undesirable peaks of response.

12. An enclosure for an electroacoustical transducer comprising: a rectilinear coupling and damping chamber having the transducer mounted on one wall thereof and having vent means in a second wall; a plurality of juxtaposed resonators opening into said chamber through a third wall, said vent means being spaced from said resonators and having mechanical resistance to provide an acoustic air load sufficient to dampen each one of the resonators; and at least one skirt means forming a non-resonant duct leading from said vent means to a port opening to air and having a skirt wall which is an extension of one of said walls; said resonators being essentially rectilinear tubes of stepped lengths modularly folded and stacked adjacent to each other to occupy a rectilinear space at least one side of which adjoins said skirt wall; whereby resonators occupying a minimal space within the enclosure can be selected to augment the output of the transducer without introducing undesirable peaks of response and the skirt contributes to the dampening and provides a baffle effect.

13. An enclosure for an electroacoustical transducer having two sides, comprising: a rectilinear damping chamber having the transducer mounted on one outside wall thereof, a set of resonators outside of and opening directly into said chamber through a second wall opposite said outside wall and having stepped effective volumes tuned to a corresponding set of frequencies emitted by the transducer, said outside wall separating the outside air on one side of said transducer from the air on the other side of the transducer and within the damping chamber; and on two opposite transverse walls of said damping chamber venting means spaced apart from said resonator openings, and having mechanical resistance to provide an acoustic air load sufficient to dampen each one of said resonators; and two skirt means forming ducts leading from said venting means along said resonators to ports opening into outside air, and having skirt walls which are extensions of said transverse walls, respectively, said resonators being essentially rectilinear tubes of stepped lengths modularly folded and stacked to occupy a rectilinear space, three sides of which are constituted by said second wall and said skirt walls; whereby resonators occupying a minimal space within the enclosure can be selected to augment the output of the transducer without introducing undesirable peaks of response.

References Cited in the file of this patent

UNITED STATES PATENTS

| | | |
|---|---|---|
| 1,901,388 | Wolff | Mar. 14, 1933 |
| 1,969,704 | D'Alton | Aug. 7, 1934 |
| 2,031,500 | Olney | Feb. 18, 1936 |
| 2,065,751 | Scheldorf | Dec. 29, 1936 |
| 2,097,289 | Olson | Oct. 26, 1937 |
| 2,643,728 | Anthony | June 30, 1953 |
| 2,670,053 | Doms | Feb. 23, 1954 |

FOREIGN PATENTS

| | | |
|---|---|---|
| 784,836 | France | May 6, 1935 |
| 789,279 | France | Aug. 12, 1935 |
| 356,557 | Italy | Feb. 4, 1938 |
| 1,025,702 | France | Jan. 28, 1953 |